United States Patent
Hwang et al.

(10) Patent No.: US 8,693,395 B2
(45) Date of Patent: Apr. 8, 2014

(54) APPARATUS AND METHOD FOR CONTROLLING OPERATION STATE OF PHYSICAL LAYER

(75) Inventors: Tae Ho Hwang, Seoul (KR); Dong Sun Kim, Seongnam-Si (KR); Kwang-Ho Won, Yongin-Si (KR)

(73) Assignee: Korean Electronics Technology Institute, Gyeonggi-do (KP)

( * ) Notice: Subject to any disclaimer, the term of this patent is extended or adjusted under 35 U.S.C. 154(b) by 977 days.

(21) Appl. No.: 12/648,832

(22) Filed: Dec. 29, 2009

(65) Prior Publication Data

US 2011/0149843 A1 Jun. 23, 2011

(30) Foreign Application Priority Data

Dec. 21, 2009 (KR) .................. 10-2009-0128409

(51) Int. Cl.
H04W 4/00 (2009.01)
H04B 3/36 (2006.01)
H04B 1/38 (2006.01)

(52) U.S. Cl.
USPC ............... 370/328; 370/338; 455/7; 455/557

(58) Field of Classification Search
USPC ............................ 370/328, 338; 455/7, 557
See application file for complete search history.

(56) References Cited

U.S. PATENT DOCUMENTS

| | | | |
|---|---|---|---|
| 2002/0083231 A1* | 6/2002 | Chiang | 710/16 |
| 2004/0131035 A1* | 7/2004 | Wakeley et al. | 370/338 |
| 2007/0066359 A1* | 3/2007 | Zhuang | 455/557 |
| 2008/0274689 A1* | 11/2008 | Kuban | 455/7 |
| 2010/0057958 A1* | 3/2010 | Kim et al. | 710/106 |

* cited by examiner

*Primary Examiner* — Brandon Renner
(74) *Attorney, Agent, or Firm* — Sughrue Mion, PLLC (57) ABSTRACT

An apparatus for controlling IEEE 802.15.4 physical layer operation state is provided. The physical layer operation state controlling apparatus defines an operation state of a physical layer including a Hardwired Low-MAC (HL-MAC) device in which functions of IEEE 802.15.4 MAC layer are hardwired, and includes a state module for controlling the operation state of the physical layer. The state module includes a Finite State Machine (FSM) for, when receiving an event for the operation state of the physical layer, transiting to a state module corresponding to the event and controlling the operation state of the physical layer; and an interrupt handler for converting an interrupt received from the physical layer to the event corresponding to a register of the state module and sending the event to the FSM. Hence, by means of the state machine for the IEEE 802.15.4 PHY, the IEEE 802.15.4 physical layer operation state can be controlled to optimize the operations of the upper MAC.

10 Claims, 7 Drawing Sheets

| State definition | Event definition |
|---|---|
| _IDLE<br>_FIFO_ACCESS<br>_BACKOFF_BOUNDARY<br>_CCA<br>_TRANSMIT<br>_RX_ACK<br>_IFS<br>_RX_ON_WHEN_IDLE<br>_RX_ACK<br>_ENERGY_DETECTION | E_RESEST<br>E_EXPIRED_TIMER<br>E_PD_DATA_REQUEST<br>E_PLME_ED_REQUEST<br>E_BUSY_CHANNEL<br>E_IDLE_CHANNEL<br>E_CHANNEL_ACCESS_FAILURE<br>E_START_TX<br>E_TX_END<br>E_TX_END_ACK_REQUIRED<br>E_RX_END<br>E_RX_END_ACK_REQUIRED<br>E_TURNON_RX |

APPARATUS AND METHOD FOR CONTROLLING OPERATION STATE OF PHYSICAL LAYER

PRIORITY

This application claims the benefit under 35 U.S.C. §119 (a) to a Korean patent application filed in the Korean Intellectual Property Office on Dec. 21, 2009 and assigned Serial No. 10-2009-0128409, the entire disclosure of which is hereby incorporated by reference.

BACKGROUND OF THE INVENTION

1. Field of the Invention

The present invention relates generally to an apparatus and a method for controlling operation state of a physical layer. More particularly, the present invention relates to an apparatus and a method for controlling the operation state of IEEE 802.15.4 physical layer by efficiently managing the state of the IEEE 802.15.4 physical layer so as to optimize operations of an upper MAC layer.

2. Description of the Related Art

IEEE 802.15.4 is the standard for specifying a Physical Layer (PHY) and a Media Access Control (MAC) layer and is one of standards for Low Rate Wireless Personal Area Network (LR-WPAN). The IEEE 802.15.4 is established to provide fundamental lower network layers of the WPAN. In particular, the IEEE 802.15.4 aims at low-cost and low-rate ubiquitous communication between devices. It features very low-cost and low-power communication of near devices without underlying communication infrastructure.

While aiming for the distance within 10~30 m and the transfer rate of about 250 kbit/s, the IEEE 802.15.4 specifies not only the PHY of one type but also various physical layers of different frequencies and modulation/demodulation schemes. Hence, the transfer rate can be divided into 20, 40, and 100 kbit/s.

Various physical layers are supported to address frequency allocation problem among nations and frequency interference problem. An embedded system requiring the low power is to selectively adopt the appropriate physical layer. In particular, the low-power specification can take into account even lower transfer rate.

The unique feature of the IEEE 802.15.4 is the simple technological structure by pursuing the low manufacturing cost. In other words, this feature of the IEEE 802.15.4 pursuits the efficiency through high-level optimization in the implementation.

Main features of the IEEE 802.15.4 protocol include a coordinator having the management function of the WPAN and its connected devices on the function basis. The IEEE 802.15.4 protocol supports two modes; that is, a low-power operation mode of the devices and a time division operation mode for the power management of the entire WPAN including the coordinator. The time division operation includes a function for reserving the guaranteed time lost to suit for real-time applications and a sleep interval of the WPAN for the low-power operations. A basic media access scheme uses collision avoidance using CSMA-CA, and supports a security function through data cryptography. As stated above, the IEEE 802.15.4 exhibits the high-level optimization as the most important feature and requires to get rid of duplication of the functions and the codes for the low-power communication in the implementations of a transceiver chipset and the protocol. To remove error in the operations and to efficiently manage the transceiver, the design for the interface and the operations between the PHY and the MAC layer needs to offer more precise definitions in the implementation than the standard document.

The PHY/MAC interface of the present-day IEEE 802.15.4 WPAN protocol is realized through Application Program Interface (API) using simple transmission and reception functions defined in most transceivers and the embedded state machine. A representative example is TI's CC2420 chip. The CC2420 chip includes a state machine which processes the state corresponding to each function for Tx/Rx according to a designated event when the power is turned on. The code used in the CC2420 chip is redundant and thus the code size is increased and the function of the MAC cannot be optimized. In addition, the MAC protocol in other chips than the corresponding chip cannot be transferred.

SUMMARY OF THE INVENTION

An aspect of the present invention is to address at least the above mentioned problems and/or disadvantages and to provide at least the advantages described below. Accordingly, an aspect of the present invention is to provide an apparatus for controlling IEEE 802.15.4 physical layer operation state by managing the state of the physical layer for IEEE 802.15.4 LR-WPAN using state machine for the IEEE 802.15.4 PHY so as to optimize operations of an upper MAC.

Another aspect of the present invention is to provide a method for controlling IEEE 802.15.4 physical layer operation state by managing the state of the physical layer for IEEE 802.15.4 LR-WPAN using state machine for the IEEE 802.15.4 PHY so as to optimize operations of an upper MAC.

Yet another aspect of the present invention is to provide a method for controlling data transmission using state machine which controls a Hardwired Low-MAC (HL-MAC) transceiver in which functions of the IEEE 802.15.4 MAC layer are hardwired.

Still another aspect of the present invention is to provide a method for controlling data reception using state machine which controls a Hardwired Low-MAC (HL-MAC) transceiver in which functions of the IEEE 802.15.4 MAC layer are hardwired.

According to one aspect of the present invention, a physical layer operation state controlling apparatus, an operation state of a physical layer comprising a Hardwired Low-MAC (HL-MAC) device in which functions of IEEE 802.15.4 MAC layer are hardwired, comprises a state module for controlling the operation state of the physical layer. The state module includes a Finite State Machine (FSM) for, when receiving an event for the operation state of the physical layer, transiting to a state module corresponding to the event and controlling the operation state of the physical layer; and an interrupt handler for converting an interrupt received from the physical layer to the event corresponding to a register of the state module and sending the event to the FSM.

The FSM may include an IDLE state module for, when receiving a RESET event, controlling to initialize a transceiver of the physical layer; a Carrier Sense Multiple Access with Collision Avoidance (CSMA-CA) state part for, when receiving a DATA REQUEST event, controlling to perform an CSMA-CA process so that the transceiver of the physical layer transmits data; a transmission state part for controlling to transmit data through a transmitter of the transceiver; a reception state part for controlling to receive data through a receiver of the transceiver; and an energy scan state part for controlling to monitor an energy state of a channel for the data transmission and reception.

The IDLE state module, when receiving the DATA REQUEST event, may change the state module from the IDLE state to a FIFO ACCESS state and write a transmit data frame to a memory of the physical layer.

The CSMA-CA state part may include a FIFO ACCESS state module for, when receiving a Clear Channel Assessment (CCA) REQUEST event, transiting the state module to a BACKOFF BOUNDARY state and controlling to perform the CSMA-CA process through a backoff timer of the physical layer, and when receiving a START TX event, controlling to send a transmit data frame in the physical layer.

The CSMA-CA state part may include a BACKOFF BOUNDARY state module for, when receiving an EXPIRED event, transiting the state module to a CCA state and controlling to monitor a data transmission channel by performing the CCA process in the physical layer.

The CSMA-CA state part may include a CCA state module for, when a BUSY CHANNEL event according to a result of the channel monitoring, updating a CSMA-CA parameter register value and controlling to re-perform the CCA process by transiting the state module to the BACKOFF BOUNDARY state, when receiving a CHANNEL ACCESS FAILURE event, controlling to cancel the transmission of the transmit data frame in the physical layer by transiting the state module to the IDLE state, and when receiving an IDLE CHANNEL event, controlling to send the transmit data frame by transiting the state module to the TRANSMIT state.

The transmission state part may include a TRANSMIT state module for, when receiving a TX END ACK REQUIRED event, controlling to receive an ACK frame by transiting the state module to a RX_ACK state, and when receiving a TX END event, controlling to drive a timer for a next Inter Frame Spacing (IFS) by transiting the state module to an IFS state.

The transmission state part may include an RX ACK state module for transiting the state module to the IFS state when receiving a RECEIVED ACK event, transiting the state module to the IDLE state when receiving a NO ACK event, and transiting the state module to the BACKOFF BOUNDARY state to retransmit the transmit data when receiving an EXPIRED TIMER event.

The transmission state part may include an IFS state module for, when a time set based on a transmit data length expires, receiving the EXPIRED TIMER event, transiting the state module to the IDLE state, and finishing the transmit data transmission.

The reception state part may include an RX_ON_WHEN_IDLE state module for, when receiving an RX END ACK REQUIRED event, finishing ACK transmission by transiting the state module to a TX ACK state, and when receiving an RX END event, transiting the state module to the IDLE state.

The reception state part may include a TX ACK state module for, when receiving a TX END event, transiting the state module to the IDLE state.

The energy scan state part, when receiving an EXPIRED TIMER event from a timer which senses the energy of the channel, may turn off the transceiver and transit the state module to the IDLE state.

The physical layer operation state controlling apparatus may further include a power supply controller for controlling power supply based on the state module operation by supporting a sleep mode until the state module operates and supporting a wake-up mode when the state module operates according to the interrupt.

The FSM may receive the event from an upper MAC layer.

According to another aspect of the present invention, a physical layer operation state controlling method includes receiving an interrupt from a physical layer which comprises a Hardwired Low-MAC (HL-MAC) device in which functions of IEEE 802.15.4 MAC layer are hardwired; converting the interrupt to an event corresponding to a register of a state module which controls the operation state of the physical layer and sending the event to a finite state machine; and controlling the operation state of the physical layer by changing the state module to a state module corresponding to the event.

According to yet another aspect of the present invention, a data transmission controlling method using a Hardwired Low-MAC (HL-MAC) transceiver in which functions of IEEE 802.15.4 MAC layer are hardwired includes transiting a state module which controls an operation state of the transceiver from an IDLE state to a FIFO ACCESS state by receiving a DATA REQUEST event from an upper MAC layer, and writing transmit data to a transmitter FIFO of the transceiver; transiting the state module to a BACKOFF BOUNDARY state by receiving a CCA REQUEST event, and performing random backoff; transiting the state module to a Clear Channel Assessment (CCA) state by receiving an EXPIRED TIMER event, and monitoring a transmit channel; and transiting the state module to a TRANSMIT state by receiving an IDLE CHANNEL event, and transmitting the transmit data.

According to still another aspect of the present invention, a data reception controlling method using a Hardwired Low-MAC (HL-MAC) transceiver in which functions of IEEE 802.15.4 MAC layer are hardwired includes transiting a state module which controls an operation state of the transceiver from an IDLE state to an RX ON WHEN IDLE state by receiving a TURN ON RX event, and receiving data at a receiver of the transceiver; transiting the state module to a TX ACK state and sending ACK when receiving an RX END ACK REQUIRED event; and transiting the state module to the IDLE state and finishing the data reception when finishing the ACK transmission and receiving a TX END event.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1A:
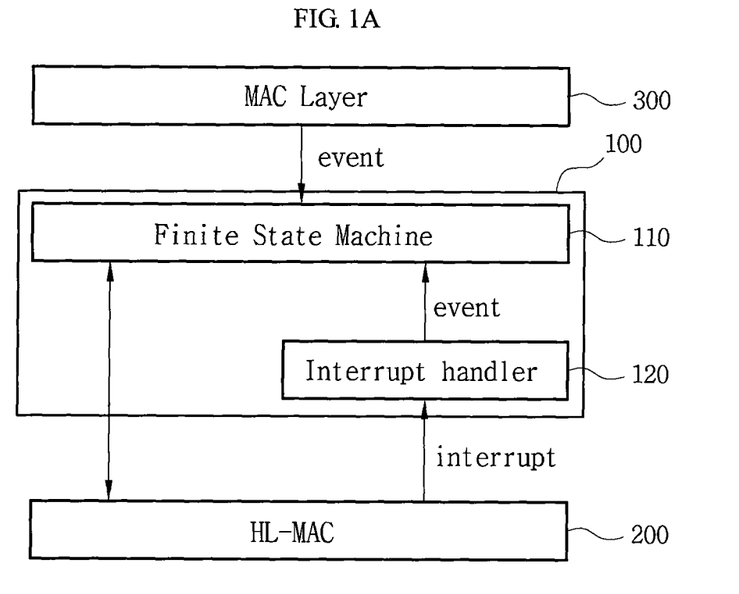
FIG. 1A is a block diagram of a physical layer operation state controlling apparatus according to an exemplary embodiment of the present invention.

FIG. 1A is a block diagram of a physical layer operation state controlling apparatus according to an exemplary embodiment of the present invention.

Referring to FIG. 1A, the physical layer operation state controlling apparatus 100 includes a Finite State Machine (FSM) 110 and an interrupt handler 120.

The FSM 110 receives a certain event from the upper MAC layer. The interrupt of the PHY including a Hardwired Low MAC (HL-MAC) device in which functions of the IEEE 802.15.4 MAC layer are hardwired is converted to the event and received at the FSM 110 through the interrupt handler 120.

The FSM is a behavior model of the system including states, transitions, and actions. The FSM can be represented in various conceptual manners using a state transition diagram preserving relations of machine states, transitions, and actions, a state table, a Labeled Directed Graph, a tree, and so on.

The FSM 110 of the present invention defines states to control the HL-MAC device in which various functions of the MAC layer specified by the IEEE 802.15.4 standard are hardware, and includes state modules by modularizing the states. The functions of the MAC layer include, for example, Clear Channel Assessment (CCA), CRC Checking Acknowledgement, TRx Pending data, Address Recognition, and IEEE 802.15.4 Superframe Management. In this regard, to ease the understanding of the invention, the CCA and the CSMA-CA of the functions of the PHY/MAC protocol of the IEEE 802.15.4 are explained.

The CCA, which is one of main processes of the CSMA-CA, returns a monitoring result of the channel state according to the currently set mode. For the CSMA-CA in the MAC, the PHY needs to offer this function through PLME-CCA.request( ) primitive as specified by the standard. However, after PLME-CCA.request( ) the MAC layer receiving the result needs to turn on a transmitter by calling PLME-CCA.request( ) again to commence the transmission. When the delay occurs in the processing of the MCU, the consistency of the CCA can be compromised and the performance can be degraded.

The CSMA-CA is defined as the channel access method in a simple structure designed to suit for the purpose of the IEEE 802.15.4 standard. In the beacon-enabled mode, the CCA is carried out in the backoff boundary (20 symbols) within the slot synchronized with a coordinator using the slotted CSMA-CA. In the non-beacon mode, the CCA is performed at a certain time point after the random backoff and data is transmitted when the channel is empty. As for the slotted CSMA-CA in the non-beacon mode, when the channel is empty according to the result of the CCA, the CCA is carried out once more in the next backoff boundary. When the channel condition is not good because of the random backoff period exponentially increasing, the throughput and the power performance can be degraded. Hence, it is important to manage the power over the time period excluding the short CCA time.

By use of the HL-MAC which implements the MAC functions as above as the hardware, the single PHY/MAC layer based on the FSM can be realized. The implemented protocol has the same functions as the PHY and MAC protocol as described by the IEEE 802.15.4 standard.

The FSM 110 defines the generalized states to control the operation state of the PHY including the HL-MAC device. The operation state of the PHY is controlled through the state modules of the FSM 110. The operation state of the PHY indicates, for example, the current state of a transceiver when the transceiver for the data transmission and reception based on the IEEE 802.15.4 transmits data. The state of the transmitter is set to on (Tx On) for the data transmission, the state of the receiver is set to on (Rx On) for the data reception, and the state of both of the transmitter and the receiver is set to off (TRx Off) to save the power in the channel monitoring process.

Upon receiving the event for the operation state of the PHY, the state module of the FSM 110 is transited to the state module corresponding to the event. The transited state module controls the operation state of the PHY according to its defined state.

For instance, it is assumed that the first state module controls the channel monitoring of the transceiver and the second state module controls the data transmission. The transceiver finishes the channel monitoring and sends a signal indicative of the empty channel to the interrupt handover 120 in the interrupt form. The interrupt handler 120 converts the interrupt to an event for the data transmission and sends the event to the FSM 110. The FSM 110 forwards the received event to the first state module. The first state module receiving the event changes the state module for controlling the transceiver from the first state module to the second state module. The second state module controls to transmit the data by Rx-on the transmitter of the transceiver.

In the conventional technique, the interrupt is received at the PHY and forwarded up to the upper MAC layer. After passing through the complicated data processing, the data is transmitted by sending a data transmission command to the PHY. In the present invention, since the physical layer operation state controlling apparatus including the FSM is implemented with the various functions of the MAC as the hardware and interposed between the PHY and the MAC layer, the MAC functions are optimized and operated through the hardware.

The interrupt handler 120 receives the interrupt from the physical layer and forwards the event to the FSM 110. The interrupt in the transceiver and the HL-MAC of the PHY is routed to the interrupt handler 120. The interrupt handler 120 divides the interrupt to software events in accordance with registers of the state modules and sends the events to the FSM 110. The states defined and the events defined to transit the state are shown in FIG. 1B.

Figure 1B:
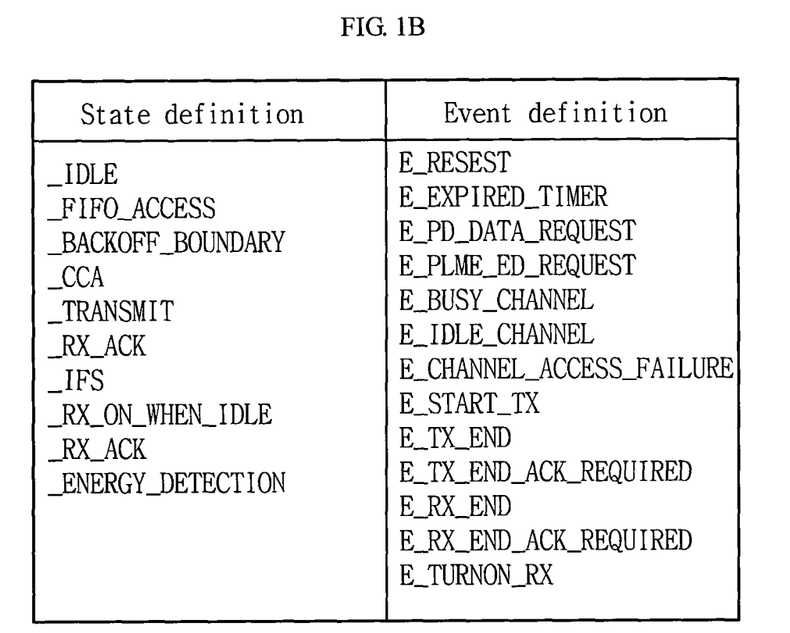
FIG. 1B shows state definitions and event definitions defined in the FSM of FIG. 1A.

FIG. 1B shows the state definitions and the event definitions defined in the FSM of FIG. 1A.

The defined states include "IDLE" state in which a certain device of the physical layer is initiated by the RESET event and waits for a next event, "FIFO ACCESS" state for waiting to write memory data for the data transmission, "BACKOFF BOUNDARY" state for waiting for the end of BACKOFF, "CCA" state for waiting for the end of the channel monitoring over a certain time, "TRANSMIT" state for waiting for the completion of the data transmission, "RX ACK" state for waiting to receive an ACK frame, "IFS" state for waiting for the expiration of a timer for the InterFrame Spacing specified by the IEEE 802.15.4, "RX ON WHEN IDLE" state for waiting to receive a frame by turning on the receiver, "TX ACK" state for waiting for the end of the ACK frame transmission, and "ENERGY DETECTION" state for waiting for the end of the energy state monitoring of the channel during the input time.

The state module which controls the operation state of the physical layer is transited by a certain event.

As for the definitions for the events, the events include "RESET" event for transiting the state module to the IDLE state, "EXPIRED TIMER" event for transiting the state module from the BACK BOUNDARY state to the CCA state, "DATA REQUEST" event for transiting the state module from the IDLE state to the FIFO ACCESS state, "CCA REQUEST" event for transiting the state module from the FIFO ACCESS state to the BACKOFF BOUNDARY state, "ED REQUEST" event for transiting the state module from the IDLE state to the ENERGY DETECTION state, "BUSY CHANNEL" event for transiting the state module from the CCA state back to the BACKOFF BOUNDARY state, "IDLE CHANNEL" event for transiting the state module from the CCA state to the TRANSMIT state, "CHANNEL ACCESS FAILURE" event for changing the state module from the CCA state to the IDLE state, "START TX" event for changing the state module from the FIFO state to the TRANSMIT state, "TX END" event for changing the state module from the TRANSMIT state to the IFS state, "TX END ACK REQUIRED" event for changing the state module from the TRANSMIT state to the RX ACK state, "RX END" event for changing the state module from the RX ON WHEN IDLE state to the IDLE state, "RX END ACK REQUIRED" event for changing the state module from the RX ON WHEN IDLE state to the TX ACK state, and "TURNON RX" event for changing the state module from the TURNON state to the RX ON WHEN IDLE state.

The events and the state transition of the state module receiving the event will be described in the state transition diagram of FIG. 3.

Figure 1C:
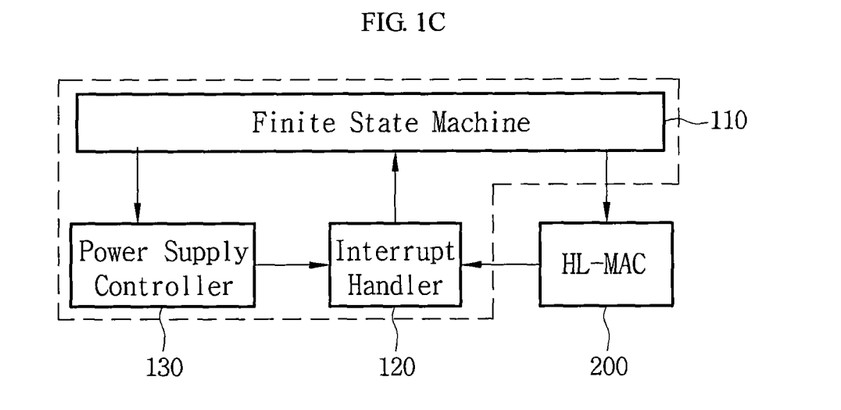
FIG. 1C is another block diagram of the physical layer operation state controlling apparatus according to an exemplary embodiment of the present invention.

FIG. 1C is another block diagram of the physical layer operation state controlling apparatus according to an exemplary embodiment of the present invention.

Referring to FIG. 1C, the FSM 110, the interrupt handler 120, and the HL-MAC 200 are the same as mentioned earlier. A power supply controller 130 sets the power supply state to a sleep mode before the state modules function, sets to a wake-up mode when the state module starts to operate according to the interrupt, and thus reduces the power consumption by controlling the power supply based on the operation of the state module.

Figure 2:
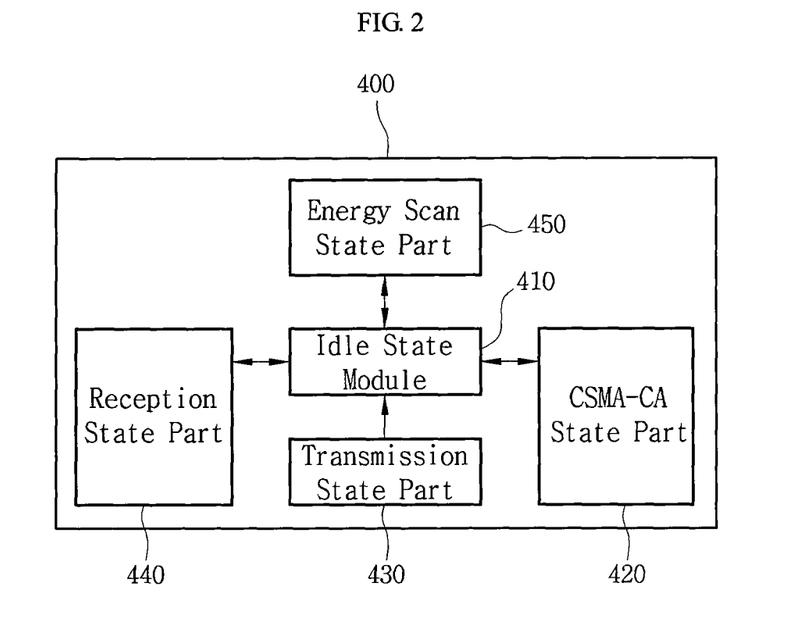
FIG. 2 is a block diagram of modularized states as defined by the FSM of the physical layer operation state controlling apparatus according to an exemplary embodiment of the present invention.
Figure 3:
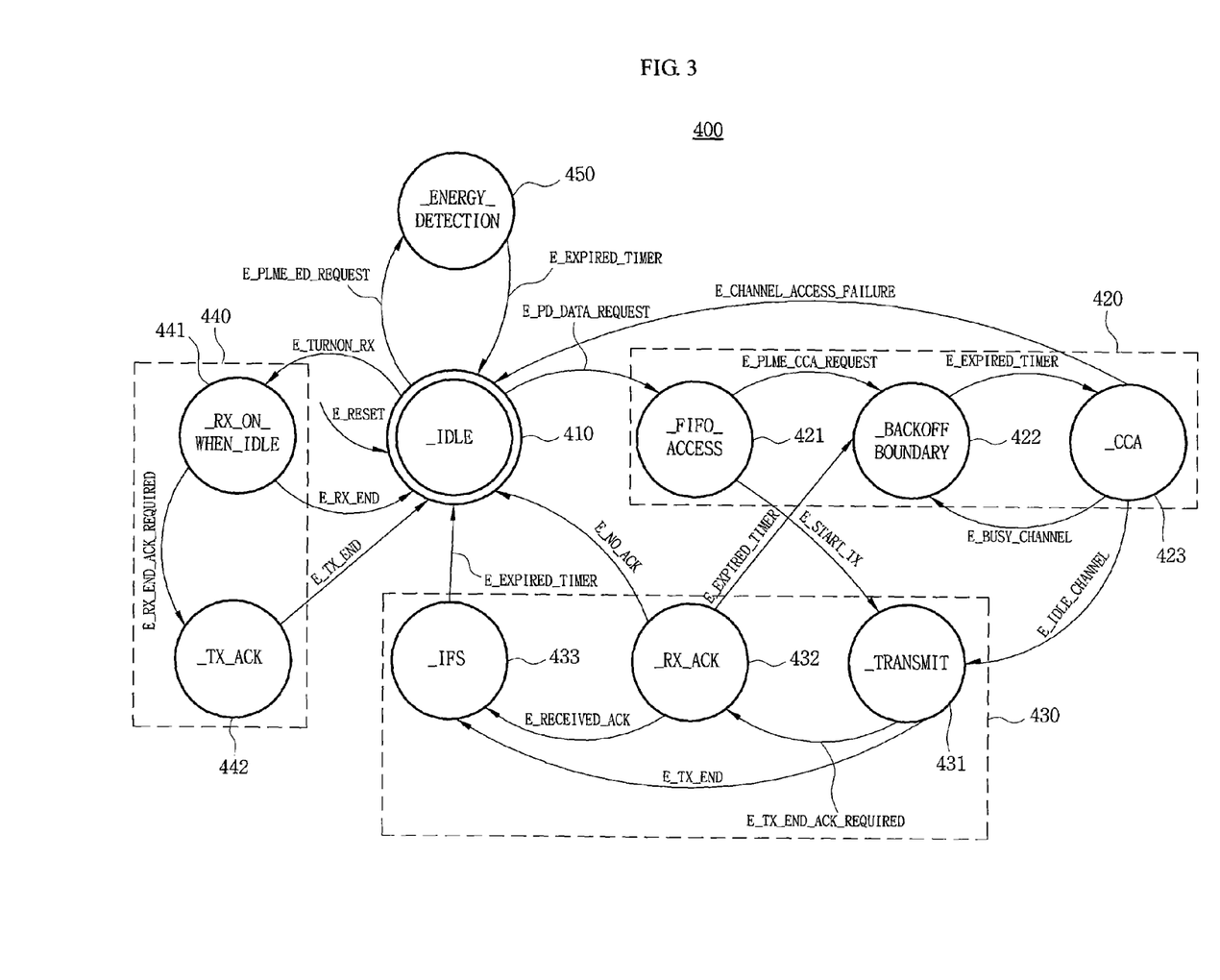
FIG. 3 is a state transition diagram of the state modules of FIG. 2 based on the events.

FIG. 2 is a block diagram of the modularized states as defined by the FSM of the physical layer operation state controlling apparatus according to an exemplary embodiment of the present invention, and FIG. 3 is a state transition diagram of the state modules of FIG. 2 based on the events.

Referring to FIG. 2, the FSM 400 of the physical layer operation state controlling apparatus according to another exemplary embodiment of the present invention includes the plurality of state modules as described above. FIG. 2 shows the aforementioned state modules blocked based on the function. The FSM 400 includes an IDLE state module 410 for controlling to initialize the transceiver of the physical when the RESET event is received, a CSMA-CA state part 420 for controlling to conduct Carrier Sense Multiple Access with Collision Avoidance (CSMA-CA) so that the transceiver of the PHY transmits the data when the DATA REQUEST event is received, a transmission state part 430 for controlling to transmit data through the transmitter of the transceiver, a reception state part 440 for controlling to receive data through the receiver of the transceiver, and an energy scan state part 450 for controlling to monitor the energy state of the channel for the data transmission and reception.

Referring to FIG. 3, the CSMA-CA state part 420 includes a FIFO ACCESS state module 421, a BACKOFF BOUNDARY state module 422, and a CCA state module 423. The transmission state part 430 includes a TRANSMIT state module 431, an RX ACK state module 432, and an IFS state module 433. The reception state part 440 includes an RX ON WHEN IDLE state module 441 and a TX ACK state module 442.

The state modules or the state parts are elucidated by referring to the state transition diagram of FIG. 3. In this exemplary embodiment, it is assumed that the device of the physical layer is the transceiver. The state transition diagram for controlling the operation state of the transceiver is now described.

In FIG. 3, upon receiving the DATA REQUEST event, the IDLE state module 410 changes the state module from the IDLE state to the FIFO ACCESS state and controls to write the transmit data frame to the memory of the HL-MAC. The DATA REQUEST event corresponds to PD_DATA.request( ) primitive of the IEEE 802.15.4.

The FIFO ACCESS state module 421 modularizes the state for waiting until the transceiver finishes the writing of the transmit data to the FIFO. The FIFO ACCESS state commences the CSMA-CA process when the CCA REQUEST event is received. The FIFO ACCESS state module 421 sets a backoff timer using the functions of the HL-MAC and manages the power of the system through the power supply controller according to the length of the backoff. Next, the FIFO ACCESS state transits to the BACKOFF BOUNDARY state. Meanwhile, upon receiving the START TX event, the FIFO ACCESS state module 421 regards as the contention free transmission and controls to immediately transmit the data without CSMA-CA.

The BACKOFF BOUNDARY state module 422 waits for the end of the backoff. When receiving the EXPIRED event from the interrupt handler, the BACKOFF BOUNDARY state module 422 searches the backoff boundary and modifies a CSMA-CA parameter value provided from the HL-MAC. Next, the BACKOFF BOUNDARY state module 422 executes the CCA function offered by the HL-MAC. The state module enters the CCA state 423.

The CCA state module 423 waits over 8 symbols or so until the channel monitoring is finished.

When the current channel is in use according to the result of the channel monitoring, the event of BUSY_CHANNEL or CHANNEL_ACCESS_FAILURE is received from the interrupt handler.

The BUSY_CHANNEL event implies that the CSMA-CA is not finished yet. Accordingly, parameter register values of the CSMA-CA are updated and the backoff is re-performed by transiting the state module to the BACKOFF BOUNDARY state.

The CHANNEL ACCESS FAILURE event implies that the channel is unavailable according to the CSMA-CA result. Thus, the state module enters the IDLE state and every transmission state is canceled.

When the channel is empty in the CCA state, the CCA state module 423 receives IDLE_CHANNEL event. With respect to this event, in case of the slotted CSMA-CA, the state module is transited to the BACKOFF BOUNDARY and the CCA process is performed once more. If no the slotted CSMA-CA, the state module controls to immediately transmit the transmit data at the HL-MAC. Next, the state module is transited to the TRANSMIT state module 430.

The TRANSMIT state module 431 modularizes the state for waiting for the completion of the data transmission. When receiving TX_END_ACK_REQUIRED event, the TRANSMIT state module 431 changes the state module to the RX_ACK state to receive the ACK frame. Next, by operating the timer while keeping the receiver in the on state, the state module waits to receive the ACK frame.

When receiving the TX_END event, which indicates the transmission without ACK, the TRANSMIT state module 431 transits the state module to the IFS state for the Inter-Frame Spacing (IFS) and then drives the timer for the IFS.

The RX ACK state module 432 modularizes the state for waiting to receive the ACK frame. When receiving the ACK, the state module receives the RECEIVED_ACK event. Not receiving the ACK, the state module receives E_EXPIRED_TIMER from the timer.

Upon receiving the RECEIVED ACK event, the state module is transited to the IFS state as in the TRANSMIT state as aforementioned. When receiving the EXPIRED TIMER event, the state module is transited to the BACKOFF BOUNDARY state to retransmit the transmit data. When receiving the E_NO_ACK event, the state module enters the IDLE state and the data transmission is finished.

The IFS state module 433 waits for the end of the time differently set according to the length of the frame for the interframe spacing specified by the IEEE 802.15.4. Next, upon receiving the EXPIRED TIMER event, the state module is transited to the IDLE state and the data transmission is finished.

The RX_ON_WHEN_IDLE state module 441 modularizes the state for turning on the receiver and waiting to receive a certain frame. The RX END ACK REQUIRED event assumes that the received frame requires the ACK frame. If not the coordinator, the HL-MAC automatically sends the ACK and the state module enters the TX ACK state to complete the transmission of the ACK frame. In case of the coordinator, it needs to directly control the HL-MAC to send the ACK. In so doing, when the type of the frame is a data request command, the ACK can be transmitted by searching the pending queue and setting the pending flag. When the RX END event is received, the data transmission is finished. Hence, the state module is changed to the IDLE state to process the received frame in the upper layer.

The TX ACK state module 442 modularizes the state for waiting for the end of the monitoring on the energy state of the channel over the input time. Upon receiving the TIMER EXPIRED event, the TX ACK state module 442 turns off the transceiver, stores the result value from the HL-MAC, and changes the state module to the IDLE state.

Figure 4:
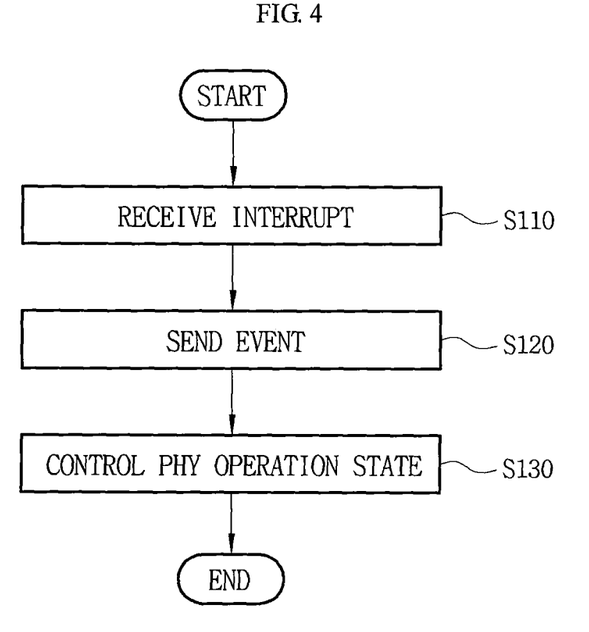
FIG. 4 is a flowchart of a physical layer operation state controlling method according to an exemplary embodiment of the present invention.

FIG. 4 is a flowchart of a physical layer operation state controlling method according to an exemplary embodiment of the present invention. The interrupt is received from the IEEE 802.15.4 physical layer (S110). The physical layer includes the HL-MAC device in which the functions of the IEEE 802.154 MAC layer are hardwired.

The interrupt is converted to the event corresponding to the register of the state module which controls the operation state of the physical layer and then transferred to the FSM (S120). The event is forwarded to the state module defined in the present invention and instructs the state module to control the physical layer. Hence, there is no need to go through the complicated procedures of the upper MAC layer according to the interrupt occurrence and to control the physical layer through some functions of the MAC layer as in the conventional method. Consequently, it is possible to greatly reduce the code size of the software of the upper MAC layer and the PHY layer and to get rid of the redundant code. In addition, the functions of the MAC layer are modularized to facilitate the processing of the unexpected error in the communication.

The state module transits to the state module corresponding to the event and controls the operation state of the physical layer (S130).

Figure 5:
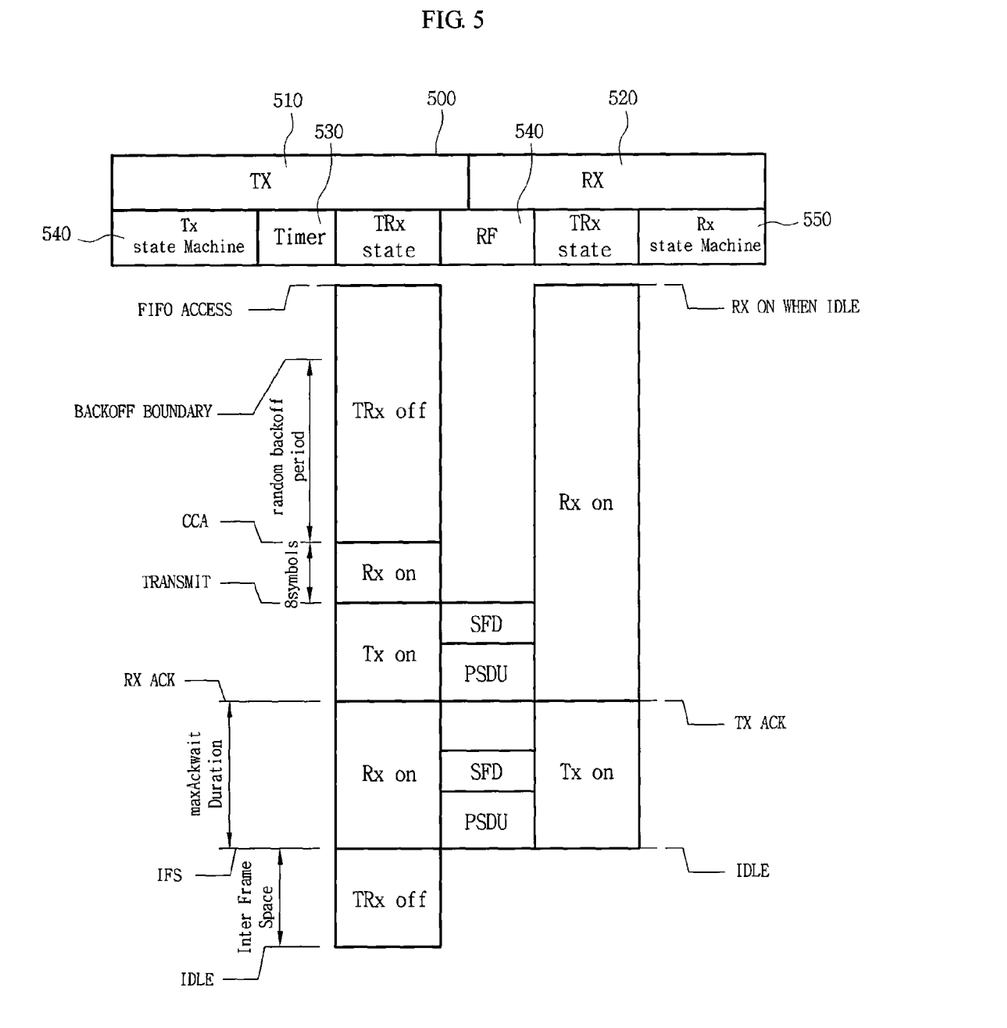
FIG. 5 is a timing diagram of data transmission and reception based on the state transition together with the operation states of the PHY using the physical layer operation state controlling method according to an exemplary embodiment of the present invention.

FIG. 5 is a timing diagram of the data transmission and reception based on the state transition together with the operation states of the physical layer using the physical layer operation state controlling method according to an exemplary embodiment of the present invention. FIG. 5 shows the diagram of the expected state change and the timing in the assumption that the acknowledge data transmission and reception is successfully carried out when the data is transmitted and received via the FSM of the present invention.

The transceiver 500 includes a Transmitter (Tx) 510 and a Receiver (Rx) 520. The Tx 510 includes a TX state machine 540 and a timer 530. The Rx 520 includes an RXs state machine 550.

The PHY of the Tx receives the DATA REQUEST message instructing to send the data, from the upper MAC and changes the state module of the FSM which controls the physical layer operation state from the IDLE state to the FIFO ACCESS state. Next, the PHY writes the data to transmit to the FIFO. In so doing, the physical state (TRx State) of the transceiver is TRx OFF.

After the random backoff in the next BACKOFF BOUNDARY state according to the CCA REQUEST event, the state module is transited to the CCA state by receiving the EXPIRED TIMER event and then the CCA is carried out. At this time, the TRx State turns on only the Rx. The CCA is performed over 8 symbols. When the channel is empty, the state module is transited to TRANSMIT and sends the data. The TRx State is Tx On. Start of Frame Delimitor (SFD) and Physical Service Data Unit (PSDU) are transmitted through the RF.

When the transmit data is data requiring the ACK, the state module enters the RX ACK state according to the TX END ACK REQUIRED event and receives the ACK over the macACKWaitDuration. The TRx State is Rx On. When the SFD and the ACK signal are transmitted through the RF, the state module enters the IFS state according to the RECEIVED ACK event. The TRx State is TRx OFF. After the time corresponding to the interframe spacing, the state module enters the IDLE state according to the EXPIRED TIMER event and the data transmission is finished.

In the reception, the state module of the FSM which sends the TURNON RX event according to MLME_RX_ENABLE.request or MLME_START primitive in the MAC layer and controls the physical layer operation state, enters the RX ON WHEN IDLE state and waits for the data frame. The TRx State is Rx On. When the data reception at the Rx 520 is finished and the RX END ACK REQUIRED event is generated, the state module enters the TX ACK state to send the ACK. The TRx State is Tx On. After finishing the ACK transmission, the state module enters the IDLE state.

Figure 6:
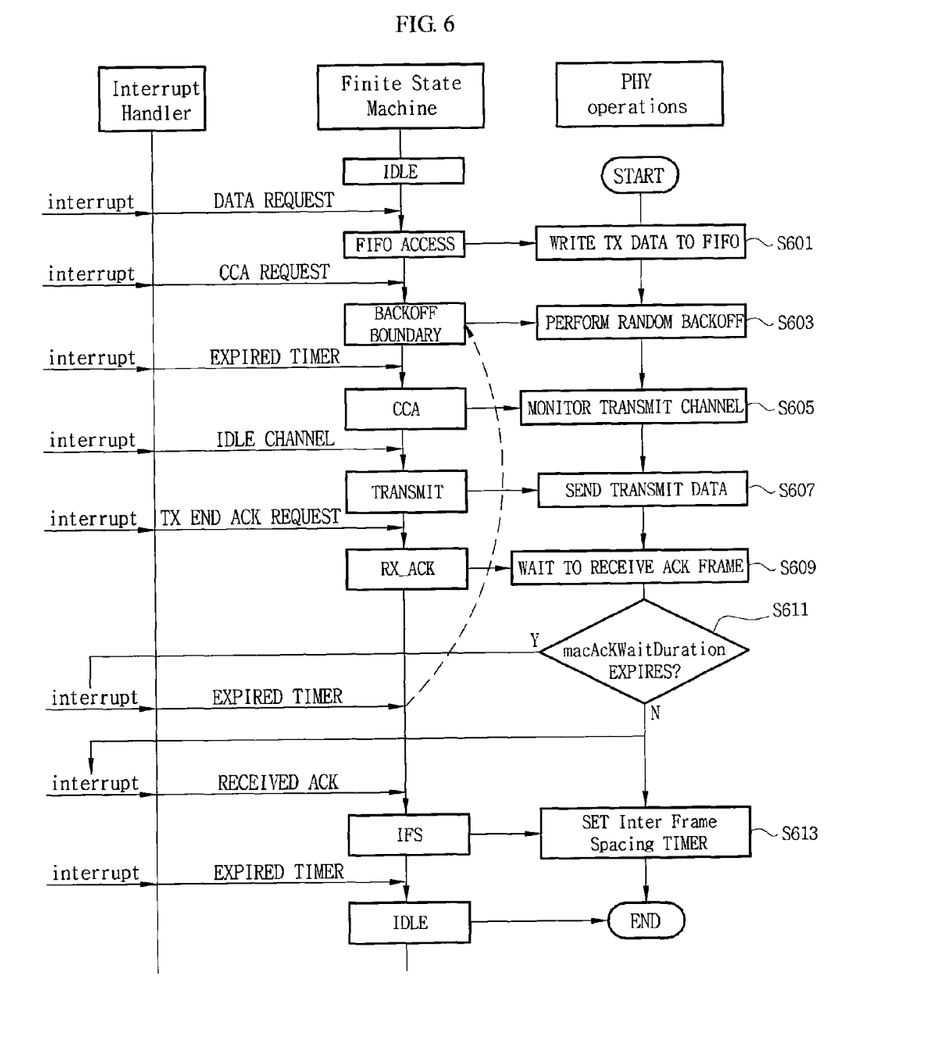
FIG. 6 is a diagram of a data transmission controlling method using the physical layer operation state controlling method according to an exemplary embodiment of the present invention, which receives the event according to an interrupt operation and controls the operation state of the PHY by transiting the state of the state module.

FIG. 6 is a diagram of a data transmission controlling method using the physical layer operation state controlling method according to an exemplary embodiment of the present invention, which receives the event according to the interrupt operation and controls the operation state of the physical layer by changing the state of the state module.

The data transmission controlling method using the HL-MAC data transceiver in which the functions of the IEEE 802.15.4 MAC layer are hardwired, receives the DATA REQUEST event from the MAC layer, changes the state module for controlling the operation state of the transceiver from the IDLE state to the FIFO ACCESS state, and writes the transmit data to the transmitter FIFO of the transceiver (S601).

The method transits the state module to the BACKOFF BOUNDARY state by receiving the CCA REQUEST event and performs the random backoff (S603).

The method transits the state module to the Clear Channel Assessment (CCA) state by receiving the EXPIRED TIMER event and monitors the transmit channel (S605).

The method transits the state module to the TRANSMIT state by receiving the IDLE CHANNEL event and sends the transmit data (S607).

When the transceiver receives the TX END ACK REQUIRED event, the state module enters the RX_ACK state and the transceiver waits to receive the ACK frame (S609).

When macAcKWaitDuration expires in the RX ACK state (S611:Y), the state module enters the BACKOFF BOUNDARY state and retries the transmit data transmission.

When receiving the RECEIVED ACK event, the transceiver transits the state module to the IFS state and sets the timer for the Inter Frame Spacing (S613).

The state module enters the IDLE state by receiving the EXPIRED TIMER event in the IFS state and the transmit data transmission is finished.

The data reception controlling method is conducted similar to FIG. 6.

The data reception controlling method using the HL-MAC data transceiver in which the functions of the IEEE 802.15.4 MAC layer are hardwired, transits the state module which controls the operation state of the transceiver from the IDLE state to the RX ON WHEN IDLE state by receiving the TURN ON RX event. The receiver of the transceiver receives the data. Upon receiving the RX END ACK REQUIRED event, the state module enters the TX ACK state and sends the ACK. When the ACK transmission is completed and the TX END event is received, the state module enters the IDLE state and the data reception is finished.

According to the present invention, the state of the physical layer for the IEEE 802.15.4 LR-WPAN is managed using the state machine for the IEEE 802.15.4 PHY. Thus, it is possible to control the IEEE 802.15.4 physical layer operation state to optimize the operations of the upper MAC.

The efficient data transmission and reception can be achieved using the state machine which controls the HL-MAC data transceiver in which the functions of the IEEE 802.15.4 MAC layer are hardwired.

It is possible to greatly reduce the software code size of the upper MAC layer and the PHY layer and to get rid of the redundant code.

By means of the FSM of the present invention, the response time and the efficiency of the power management can be improved by optimizing the processing structure of the software.

Further, since the present invention can be commonly applied to various communication chipsets supporting the IEEE 802.15.4, its portability can be raised.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus controlling an operation state of a physical layer comprising a Hardwired Low-MAC (HL-MAC) device in which functions of IEEE 802.15.4 MAC layer are hardwired, the apparatus comprising:
    a finite state machine (FSM) which is, when receiving an event for the operation state of the physical layer, configured to change a state module of the FSM to a state module corresponding to the event and controlling the operation state of the physical layer; and
    a processor and memory which is configured to convert an interrupt received from the physical layer to the event corresponding to a register of the state module and sending the event to the FSM,
    wherein the FSM is configured to not forward any interrupt received from the physical layer to the MAC layer.

2. The apparatus of claim 1, wherein the FSM comprises:
    an IDLE state module for, when receiving a RESET event, controlling to initialize a transceiver of the physical layer;
    a Carrier Sense Multiple Access with Collision Avoidance (CSMA-CA) state part for, when receiving a DATA REQUEST event, controlling to perform a CSMA-CA process so that the transceiver of the physical layer transmits data;
    a transmission state part for controlling to transmit data through a transmitter of the transceiver;
    a reception state part for controlling to receive data through a receiver of the transceiver; and
    an energy scan state part for controlling to monitor an energy state of a channel for the data transmission and reception.

3. The apparatus of claim 2, wherein the IDLE state module, when receiving the DATA REQUEST event, changes the state module from the IDLE state to a FIFO ACCESS state and writes a transmit data frame to a memory of the physical layer.

4. The apparatus of claim 2, wherein the CSMA-CA state part comprises:
    a FIFO ACCESS state module for, when receiving a Clear Channel Assessment (CCA) REQUEST event, transiting the state module to a BACKOFF BOUNDARY state and controlling to perform the CSMA-CA process through a backoff timer of the physical layer, and when receiving a START TX event, controlling to send a transmit data frame in the physical layer;
a BACKOFF BOUNDARY state module for, when receiving an EXPIRED event, transiting the state module to a CCA state and controlling to monitor a data transmission channel by performing the CCA process in the physical layer; and
a CCA state module for:
when receiving a BUSY CHANNEL event according to a result of the channel monitoring, updating a CSMA-CA parameter register value and controlling to re-perform the CCA process by transiting the state module to the BACKOFF BOUNDARY state;
when receiving a CHANNEL ACCESS FAILURE event, controlling to cancel the transmission of the transmit data frame in the physical layer by transiting the state module to the IDLE state; and
when receiving an IDLE CHANNEL event, controlling to send the transmit data frame by transiting the state module to the TRANSMIT state.

5. The apparatus of claim 2, wherein the transmission state part comprises:
a TRANSMIT state module for, when receiving a TX END ACK REQUIRED event, controlling to receive an ACK frame by transiting the state module to a RX_ACK state, and when receiving a TX END event, controlling to drive a timer for a next Inter Frame Spacing (IFS) by transiting the state module to an IFS state;
an RX ACK state module for transiting the state module to the IFS state when receiving a RECEIVED ACK event, transiting the state module to the IDLE state when receiving a NO ACK event, and transiting the state module to the BACKOFF BOUNDARY state to retransmit the transmit data when receiving an EXPIRED TIMER event; and
an IFS state module for, when a time set based on a transmit data length expires, receiving the EXPIRED TIMER event, transiting the state module to the IDLE state, and finishing the transmit data transmission.

6. The apparatus of claim 2, wherein the reception state part comprises:
an RX_ON_WHEN_IDLE state module for, when receiving an RX END ACK REQUIRED event, finishing ACK transmission by transiting the state module to a TX ACK state, and when receiving an RX END event, transiting the state module to the IDLE state; and
a TX ACK state module for, when receiving a TX END event, transiting the state module to the IDLE state.

7. The apparatus of claim 2, wherein the energy scan state part, when receiving an EXPIRED TIMER event from a timer which senses the energy of the channel, turns off the transceiver and transits the state module to the IDLE state.

8. The apparatus of claim 1, further comprising:
a power supply controller for controlling power supply based on the state module operation by supporting a sleep mode until the state module operates and supporting a wake-up mode when the state module operates according to the interrupt.

9. The apparatus of claim 1, wherein the FSM receives the event from an upper MAC layer.

10. A method of controlling an operation state of a physical layer, the method comprising:
receiving an interrupt from a physical layer which comprises a Hardwired Low-MAC (HL-MAC) device in which functions of IEEE 802.15.4 MAC layer are hardwired;
converting the interrupt to an event corresponding to a register of a state module which controls the operation state of the physical layer and sending the event to a finite state machine (FSM); and
controlling the operation state of the physical layer by having the FSM transit to a state module corresponding to the event,
wherein the FSM is configured to not forward any interrupt received from the physical layer to the MAC layer.

* * * * *